March 5, 1957 W. SCHMIDT 2,784,080
PROCESS FOR DISTILLATION OF AMALGAMS
Filed June 24, 1952
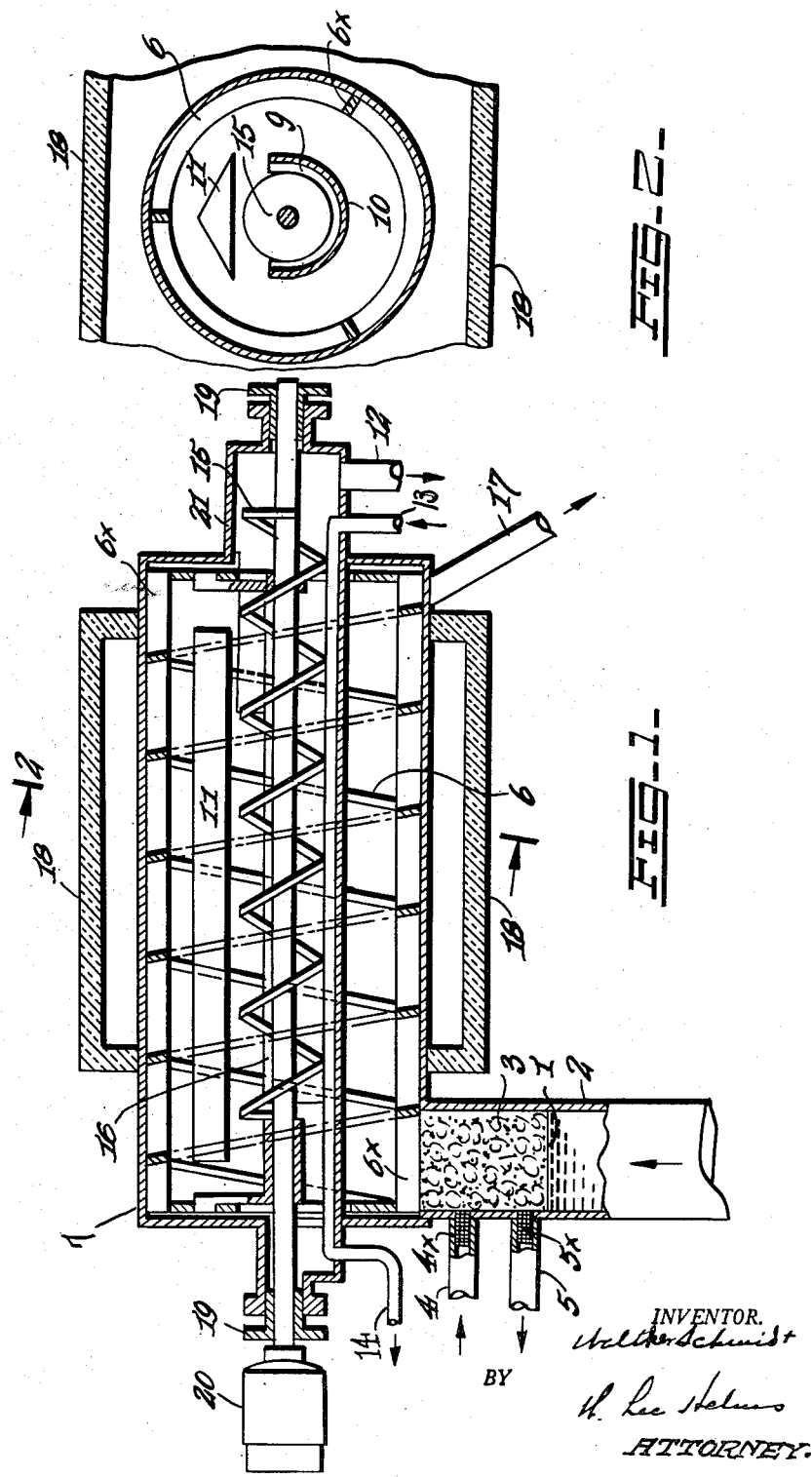
INVENTOR.
Walther Schmidt
BY
W. Lee Helms
ATTORNEY.

United States Patent Office 2,784,080
Patented Mar. 5, 1957

2,784,080

PROCESS FOR DISTILLATION OF AMALGAMS

Walther Schmidt, Richmond, Va., assignor to Reynolds Metals Company, Richmond, Va., a corporation of Delaware Application June 24, 1952, Serial No. 295,329

1 Claim. (Cl. 75—63)

This invention relates to a process and apparatus for distillation of mercury from metal crystals.

It is an object of this invention to provide a process for continuous distilling and continuously condensing volatile material in a single chamber.

It is also an object of this invention to provide an apparatus for continuously distilling and continuously condensing volatiles in a common chamber.

It is a further object of this invention to provide an efficient, inexpensive process for removing mercury from metal crystals of aluminum, beryllium, titanium or zirconium crystallized out of said mercury.

These and other objects will become apparent upon reading the following disclosure in conjunction with the accompanying drawing in which, Fig. 1 is a longitudinal section of the apparatus and Fig. 2 is a transverse section taken on line 2—2 of Fig. 1.

Many metals can be produced in the form of amalgams, in solution or in suspension with mercury. It has also been proposed to perform metallurgical reactions, e. g. such as the reaction of titanium chloride with sodium to produce metallic titanium (Ti) and sodium chloride, $TiCl_4 + 4Na = Ti + 4NaCl$, by using Na amalgam. The Ti is insoluble in Hg and can thus be mechanically separated as a mass of crystals which may, however, be contaminated with adherent Hg. Some of these metals form solid solutions with Hg or metallic compounds like MgHg. It is a difficult problem to remove the Hg by distillation from the crystals of the liberated metal e. g. titanium. One of the main difficulties is that in industrial operations large volume of Hg vapors are created and leave the distillation apparatus with high speed thereby carrying over large amounts of metal powders into the condenser. If, for example, aluminum crystals, prepared by leaching Al—Si alloys with mercury, are distilled to recover any mercury adhereing thereto, about 20% of the aluminum is carried over into the Hg condenser.

According to this invention, this difficulty is overcome by condensing the mercury within the distillation chamber itself. This may be accomplished by regulating the velocity of the Hg vapors by allowing a suitable pressure to build up while large quantities of Hg are present and thereafter applying vacuum.

Since the materials to be freed from mercury are recovered in mercury, the feed into the distillation apparatus is preferably done as shown in Figs. 1 and 2, using the buoyancy of the materials rising atop of the upper mercury level 1, e. g. in the tube 2. The space 3 above the mercury level 1 is filled gradually with the recovered metals, e. g. Al, Be, Cr, Mg, Ti, V, or Zr, together with other products of the reaction, e. g. NaCl or $MgCl_2$. These chloride salts can be dissolved by leaching the material with solvents such as $H_2O$, or organic compounds like alcohol. In the example shown in Figs. 1 and 2 the material is washed with water before entering the distillation device. The water is pumped into space 3 from tubes 4 and leaves space 3 by tubes 5 preferably passing through suitable filters 4X and 5X in tubes 4 and 5 respectively. By feeding more material it is finally floated up to the level of the conveyor 6 whereupon the material is passed into drum 7. The conveyor 6 consists of a screw with baffles 6X which lifts part of the material and lets it fall in order to allow large surfaces of the powder to give off Hg vapors. Inside of the drum is a channel which is water-cooled and insulated at the bottom. Fig. 2 shows the channel 9 through which the water flows and the insulation 10. A roof 11 protects the channel from powder falling into the channel 9. The mercury and residual solvent are vaporized and condensed within the channel 9 and flows off through pipe 12. The cooling water enters pipe 13 and leaves pipe 14. Inside channel 9 is a screw conveyor 15 connected with the conveyor 6 but operating in the opposite direction which cleans continuously the mercury surface within the condenser channel by skimming off any metal powder which may have been carried over with the condensing vapors and settled thereon. The skimmings are discharged at the end 16 of conveyor 15, to be recycled by conveyor 6. The material is finally discharged at outlet 17 from where it may be collected in drums or fed into compressing apparatus such as rolls, or presses, to be shaped into a compact form. This process is performed in the absence of air. The drum is operated within the furnace 18, which may be heated by fuel or electrically. The axle of the conveyors are kept tight by stuffing boxes 19 outside the heated area. These axles are driven by a motor 20. The level of the mercury within the condenser channel is kept at a desired height by means of a syphon. The channel ends at the side at which the mercury is discharged preferably through a tube 21.

This process is adapted for the removal of the major part of Hg and may be followed by melting or sintering of the powdery metal during which operations the residue of Hg may be driven off, finally with the use of a vacuum.

The apparatus described herein is only an illustrative embodiment of my invention. It is, for example, not necessary to have the condensing channel around the axle. It can also be arranged outside the axle or in an extension within the vessel. It is, however, essential that the access of the vapors to that extension vessel be wide enough to keep the speed of vapors low and allow dust to fall back to the distillation drum.

Having described my invention, what I claim and desire to secure by Letters Patent, is as follows:

In a process in which a mercury amalgam having suspended therein crystals of a metal selected from the group consisting of aluminum, beryllium, titanium and zirconium, is continuously fed into a distillation vessel for separation of the metal crystals from said mercury, the improvement comprising the steps of condensing the distilled mercury within the distillation vessel into a pool of liquid mercury and continuously withdrawing heat therefrom, continuously removing mercury from said pool so as to maintain the level thereof at a pre-determined height, skimming the surface of said pool for removal of any metal crystals therein, reintroducing said skimmed crystals into the distillation vessel, with the continuous feed, and removing from said vessel the separated metal crystals.

References Cited in the file of this patent

UNITED STATES PATENTS

| 1,535,467 | Hedges | Apr. 28, 1925 |
| 1,839,086 | Coley | Dec. 29, 1931 |
| 1,961,135 | Crahan et al. | June 5, 1934 |
| 2,266,475 | Ramsay | Dec. 16, 1941 |
| 2,331,988 | Loevenstein | Oct. 19, 1943 |
| 2,348,673 | Degner | May 9, 1944 |
| 2,615,706 | Davey | Oct. 28, 1952 |
| 2,618,549 | Glasser et al. | Nov. 18, 1952 |
| 2,618,550 | Hampel et al. | Nov. 18, 1952 |